March 14, 1950
S. T. MEYERS
2,500,424
NEGATIVE FEEDBACK AMPLIFIER
Filed Dec. 3, 1947
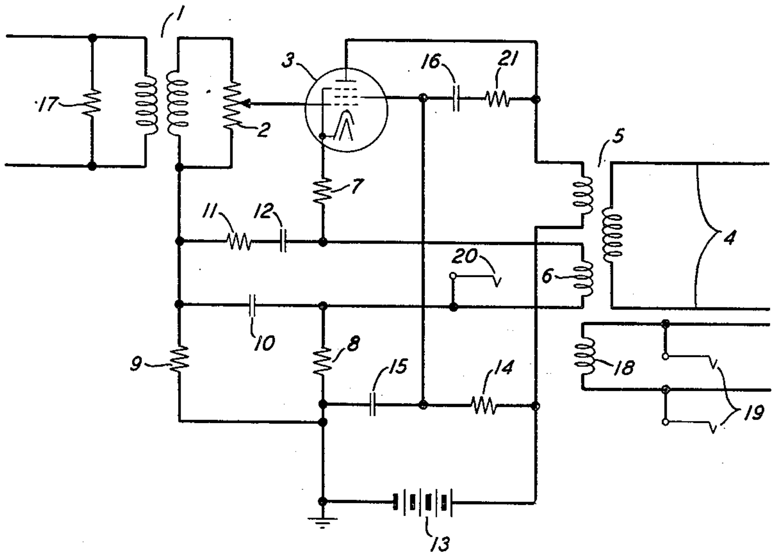
INVENTOR
S. T. MEYERS
BY
B. G. Leger
ATTORNEY Patented Mar. 14, 1950 2,500,424

UNITED STATES PATENT OFFICE 2,500,424

NEGATIVE FEEDBACK AMPLIFIER

Stanley T. Meyers, East Orange, N. J., assignor to Bell Telephone Laboratories, Incorporated, New York, N. Y., a corporation of New York Application December 3, 1947, Serial No. 789,355

12 Claims. (Cl. 179—171)

This invention relates to electric wave amplifiers, for example, voice frequency amplifiers suitable for use in telephone repeaters.

It is often desirable that, in the lower portion of their frequency transmission band, such repeater amplifiers have their output impedance increased in magnitude and rotated negatively in phase with decrease of frequency, to match the impedance of an attached standard telephone line circuit including equipment such as filters and equalizers, without having the production of this impedance versus frequency change substantially affect the amplifier gain versus frequency characteristic in that portion of the band.

An object of the invention is to control transmission properties of amplifiers, for example their characteristics of output impedance versus frequency and gain versus frequency.

It is also an object of the invention to cause the output impedance of an amplifier, in a prescribed portion of the transmission band, for example the lower portion of the band, to undergo a prescribed change with decrease of frequency, for example a prescribed magnitude increase and a prescribed negative phase rotation, without necessitating substantial change in the gain versus frequency characteristic in that portion of the band.

In accordance with the invention, these objects may be effected by negative feedback of voltages suitably series-derived and shunt-derived from the amplifier output and suitably varied with frequency as taught hereinafter.

A feature of the invention relates to provision of a resistance-condenser network in the grid circuit of the amplifier for altering the feedback at low frequencies to control the amplifier output impedance, for example to increase the amplifier output impedance with frequency decrease in the lower portion of the transmission band of the amplifier. In accordance with the invention the network may be of high impedance. This minimizes power losses in the amplifier output due to bridging of impedance across the shunt-derived feedback path, and reduces the physical size of condensers required in the network.

The invention provides an amplifier circuit wherein: the amplifier output impedance is stabilized, by series-derived and shunt-derived negative feedbacks, against changes in feedback due to variations in tubes and power supply; the amplifier output impedance is caused, by relative variation of the series-derived and shunt-derived feedbacks, to increase in magnitude and rotate negatively in phase with decrease of frequency in the lower portion of the transmission band; the amplifier gain may be continuously adjusted over a wide range of values while remaining substantially uniform over the transmission band; the amplifier output impedance is substantially unaffected by the gain adjustment; the power carrying capacity of the amplifier is substantially unaffected by the gain adjustment and is not unduly reduced by the means for effecting the relative variation of series-derived and shunt-derived feedbacks; the amplifier input impedance in the transmission band is substantially unaffected by feedback or by change of gain adjustment; and the physical elements of the amplifier, including vacuum tube, coils, condensers and resistances may be of small dimensions.

Other objects, aspects and features of the invention will be apparent from the following description and claims.

The single figure of the drawing shows an amplifier circuit such as that just mentioned, embodying one form of the invention.

The circuit of the figure is of the general type disclosed in S. T. Meyers Patent 2,267,286, December 23, 1941. The circuit of the figure comprises an input transformer 1 coupled through a gain control slider-type potentiometer 2 on the secondary side to the grid of a vacuum tube 3 whose plate circuit is coupled to an outgoing load circuit 4 through a suitable output transformer 5. Part of the negative feedback in the amplifier is derived by means of a voltage developed across a feedback winding 6, which is inductively coupled to the output transformer and inserted in series with the cathode and input grid circuits. This provides shunt negative feedback with respect to the output load circuit and series negative feedback with respect to the input transformer. Another component of negative feedback is derived across the 270- and 300-ohm grid bias resistances 7 and 8 in series with the feedback winding in the cathode circuit. These two resistances provide series negative feedback components with respect to both output and input circuits. As all feedback into the grid circuit is in series with the input transformer and grid-cathode circuit of the vacuum tube there is no effect due to feedback on the amplifier input impedance in the useful frequency range of the amplifier. This is because the grid cathode impedance of the vacuum tube is very high in this range. However, in the output circuit the series feedback and shunt feedback derived respectively from the cathode circuit resistances and feedback winding on the output transformer combine to provide the amplifier with a bridge-type feedback connection giving an amplifier output impedance which tends to be stabilized against changes in feedback due to variations in tubes and power supply.

To give the amplifier output impedance a prescribed frequency characteristic regarding magnitude and phase angle, the amounts of negative feedback contributed by the shunt and series components from the plate circuit are altered by means of the associated resistance and condenser networks in the grid circuit. One of these networks comprises elements 9 and 10. The other comprises elements 10, 11 and 12.

At the high frequencies the resistance-condenser filtering network comprising elements 9 and 10 (.22 megohm and .01 microfarad) across the 300-ohm cathode resistance 8 eliminates the series feedback component due to that resistance 8. However, the filtering produced by that resistance-condenser network is such that in the portion of the transmission band at the low frequency end of the band it becomes small enough to allow a suitable amount of series-derived negative feedback to be added. This alters the amplifier output impedance at low frequencies, producing an increase in magnitude and at the same time an impedance phase angle change in the negative direction.

The resistance-condenser network comprising elements 10, 11 and 12 (.01 microfarad, .24 megohm and .05 microfarad) across the feedback winding produces substantially no reduction in the shunt-derived feedback component at high frequencies, since at such frequencies the impedance of 10 is small compared to that of 11 and 12 in series. But at low frequencies (that is, at frequencies in the transmission band near the low frequency end of the band), this resistance-condenser network increases its loss (i. e., its attenuation of voltage in transmission from coil 6 to the grid and cathode of tube 3, thereby causing the shunt-derived component of feedback to decrease, which in turn causes the amplifier output impedance magnitude to rise with an impedance phase angle change in the negative direction. The sum of the changes in series-derived and shunt-derived feedback due to the associated resistance-condenser networks in the grid circuit produces the required change in amplifier output impedance magnitude, with the desired associated phase angle change, to yield the prescribed characteristics of output impedance magnitude versus frequency and output impedance phase angle versus frequency.

The increase of series-derived negative feedback at low frequencies that is produced by the resistance-capacity network comprising elements 8, 9 and 10, and the decrease of shunt-derived negative feedback at low frequencies that is produced by the resistance-capacity network comprising elements 10, 11 and 12, oppose each other's effects upon the amplifier gain, and if desired may neutralize each other's effects upon the gain, in the useful transmission band of the amplifier. Thus for that band, the amplifier gain versus frequency characteristic may be given a prescribed shape, whether or not that is the same shape that the characteristic would have if those effects were absent. For example, the gain versus frequency characteristic of the amplifier may be made substantially flat over the transmission band. There is substantially no change in the shape with change in the setting of potentiometer 2.

The resistance-condenser networks, composed of elements 9 and 10 and elements 10, 11 and 12, are made of high impedance. This minimizes power losses in the amplifier output due to bridging of impedances across the feedback winding of the output transformer. Also, it reduces the physical size of condensers required in the networks, thus facilitating the physical construction of a small amplifer.

The impedances 11 and 12 in series are bridged across winding 6 through a branched circuit having impedance 10 in one branch and having impedances 8 and 9 in series in another branch. Throughout the useful transmission frequency band of the amplifier the impedance of resistance 11 is many times the magnitude of the impedance of winding 6, which may be, for example, of the order of 100 ohms. This high ratio minimizes the power loss in transmission from tube 3 to circuit 4. Moreover, making resistance 11 of high impedance minimizes the capacity required in condenser 10 (and therefore the condenser size required) to avoid undue attenuation of the feedback from coil 6 in the upper portion of the transmission band of the amplifier, and consequently minimizes also the capacity required in condenser 12, which is preferably of higher capacity than condenser 10 in order to avoid unduly reducing the effectiveness of condenser 10 in decreasing the feedback from coil 6 with frequency decrease in the lower portion of the transmission band of the amplifier. The impedance of resistance 9 is many times as high as the impedance of condenser 10 in the upper portion of the transmission band of the amplifier. This high ratio minimizes the capacity required in condenser 10 for adequate increase of the feedback from resistance 8 with decrease of frequency in the lower portion of the transmission band of the amplifier.

The tube 3 may be, for example, a miniature tube, for instance a standard 6AK5 vacuum tube with indirectly heated cathode.

The impedance values given above for elements 6 to 12 are by way of example, and similarly illustrative values may be given for other impedances, voltages, etc., as follows: The plate battery 13, or other source of space current, may be of 130 volts. The screen grid current supply resistor 14 and by-pass condenser 15 may have values of 9100 ohms and 1 microfarad. A condenser 16 of 750 micromicrofarads and resistance 21 of 4300 ohms may be connected in series from plate to screen grid so as to by-pass the plate winding (through condenser 15), in order to prevent singing at high frequencies. The amplifier input impedance is independent of feedback, as indicated above. It is made up of the input transformer and its associated resistance shunts, including resistance 17 and potentiometer 2, and the grid capacity of tube 3. The resistance 17 may have a value of 1200 ohms. An amplifier with its components as specified above by way of example, has a gain of about 36 decibels with potentiometer 2 at the maximum gain setting, and the gain can be varied continuously from this gain to a loss, by the potentiometer 2, which may be, for example, a two-megohm small carbon composition potentiometer, logarithmically tapered, of 40 decibels range. The total amount of feedback over the useful transmission band of the amplifier is about 14 decibels and is independent of gain adjustment. This feedback gives considerable stabilization of the gain against tube and battery variations.

An auxiliary winding 18 on the output transformer 5 is provided for monitoring and is connected to pin jacks 19 preferably located on the amplifier casing (not shown) in which the amplifier is contained.

A pin jack 20 provided for measuring the space current drop across resistance 8 for cathode activity tests is also preferably located on the amplifier casing. For example, the amplifier may be of the plug-in type and the tube socket, potentiometer, and jacks 19 and 20 may all be mounted directly on the amplifier casing, and, where a resistance is required for controlling the heater current it may be mounted on the socket into which the amplifier is plugged. With the provision of the pin jacks on the amplifier for monitoring and for testing cathode activity, jacks can be eliminated at the amplifier bay, being retained at another location only when required for patching purposes.

What is claimed is:

1. A wave amplifying electric space discharge device comprising an anode, a cathode and a grid, a space current source therefor, an output transformer therefor having a primary winding, a negative feedback coil inductively coupled to said winding, a circuit from said cathode to said anode including in series in the following order a negative feedback resistance, said coil, a grid bias resistance, said source and said winding, a path comprising a filter resistance and a filter condenser in series connected across said bias resistance with said condenser connected to said circuit at a point between said bias resistance and said coil, means for connecting a wave source between said grid and a point on said path between said filter resistance and said condenser, and a path including a resistance and a condenser in series connecting the latter point to said circuit at a point between said feedback resistance and said coil.

2. A wave translating system comprising: an electric discharge device; an input circuit for said device including in series a wave source and a resistance; an output transformer for said device; an output circuit for said device including in series a winding of said transformer and a space current source for said device; a path included in said input circuit in series with said wave source and said resistance, with said resistance between said wave source and said path, said path being included also in said output circuit, and said path including in series a second resistance, a third resistance and said winding of said output transformer connected between said second and third resistances and between said second and said first-mentioned resistances; a filter condenser connecting said first-mentioned resistance and said third resistance in series; and a path connected across said winding and including in series a second condenser, a fourth resistance and said filter condenser.

3. A vacuum tube having a cathode, an anode and a grid and having in series in its input circuit a signal source, a cathode lead, and a first resistance connected therebetween, and having in series in its output circuit an output coil, said cathode lead and a source of space current for said tube, said cathode lead including in series second and third resistances and therebetween a negative feedback coil inductively related to said first coil with said second resistance between said cathode and said feedback coil, a condenser path connecting a point between said feedback coil and said third resistance to a point between said first resistance and said signal source, and a path comprising a fourth resistance and second condenser in series connecting the latter point to a point between said second resistance and said feedback coil.

4. A wave amplifying device having an anode, a cathode and a grid, an output transformer therefor having a primary winding, a negative feedback coil inductively coupled to said winding, a negative feedback resistance connected between said cathode and said coil, a circuit connecting said resistance, said coil and said winding in series between said cathode and said anode, a path comprising a second resistance and a condenser in series connected across said coil with said second resistance connected to said circuit at a point between said feedback resistance and said coil, and means for connecting a wave source between said grid and a point on said path between said second resistance and said condenser.

5. A voice frequency amplifier comprising an electric space discharge device having an anode, a cathode, and a grid, an input circuit for said device including in series a signal source and a condenser, an output circuit for said device, an output transformer for said device having a winding in said output circuit, a path exclusive of said condenser connected at one end to said cathode and included in said input circuit and in said output circuit, said path including in series a feedback resistance and a feedback winding connected between said resistance and said first-mentioned winding and inductively related to said first-mentioned winding, and a path connected across said feedback winding and including in series said condenser and a resistance high in magnitude compared to the impedance of said feedback winding in the frequency transmission range of said amplifier.

6. A system for amplifying waves of a given frequency range comprising a source of waves to be amplified, a device for amplifying waves from said source comprising an anode, a cathode and a grid, an output transformer therefor having a primary winding, a negative feedback coil inductively coupled to said winding, a negative feedback resistance connected between said cathode and said coil, a circuit connecting said resistance, said coil and said winding in series between said cathode and said anode, with said resistance between said cathode and said winding, a path of impedance high compared to that of said coil in said frequency range comprising a second resistance and a condenser in series connected across said coil with said second resistance connected to said circuit at a point between said feedback resistance and said coil, and means connecting said wave source between said grid and a point on said path between said second resistance and said condenser, said second resistance and said condenser having relative impedance values that cause the ratio of the voltage across said second resistance to that across said coil to be substantially uniform over the upper portion of said range but to decrease with frequency decrease in the lower portion of said range.

7. An electric space discharge device having an anode, a cathode and a grid, a source of space current therefor, an output transformer therefor having a primary winding, a negative feedback coil inductively related to said winding, a direct current circuit from said cathode to said anode including in the following order a negative feedback resistance, said coil, said source and said winding, a path comprising a second resistance and a condenser in series connected across said coil with said second resistance connected to said circuit at a point between said feedback resistance and said coil, and means for connecting a source of waves to be amplified by said device between said grid and a point on said path between said second resistance and said condenser.

8. An amplifying device for waves of a given frequency range having input and output circuits, an output transformer therefor having a primary winding for receiving waves from said output circuit, a coil inductively coupled to said winding, a wave source for association with said input circuit, an impedance for producing negative feedback in said device serially related to said input circuit with respect to said wave source and serially related to said winding with respect to said output circuit, and a path in serial relation to said input circuit with respect to said wave source, said path having two branches in parallel, one of said branches including a resistance and the other including said coil and a condenser in series, said coil producing negative feedback to said input circuit, said resistance and condenser cooperating to decrease the latter feedback with decrease of frequency in the lower portion of said frequency range, and the impedance of said condenser and resistance in series being high compared to the impedance of said coil in said frequency range.

9. A wave amplifier for waves of a given frequency range comprising an anode circuit and a grid circuit, means for producing in said amplifier two negative feedback components, one series-derived and the other shunt-derived from said anode circuit, a network of resistive and capacitive impedances working from a portion of said anode circuit into said grid circuit for increasing said series-derived feedback component with frequency decrease in the lower portion of said frequency range, and a second network of resistive and capacitive impedances working from another portion of said anode circuit into said grid circuit for decreasing said shunt-derived feedback component with frequency decrease in said portion of said frequency range, said networks having a portion only in common, and each of said networks having its input impedance of higher order of magnitude than the impedance from which it works in said given frequency range.

10. A wave amplifier for waves of a given frequency range comprising an anode circuit and a grid circuit having as a common portion a direct-current path, said path including means for producing in said amplifier two negative feedback components, one series-derived and the other shunt-derived from said anode circuit, and a network of resistive and capacitive impedances in said grid circuit for varying in given sense the magnitude of said series-derived and varying in inverse sense the magnitude of said shunt-derived feedback component with given frequency change in a given portion of said frequency range, said path excluding said impedances.

11. An amplifier for waves of a given frequency range comprising a vacuum tube having a cathode, an anode and a grid, an anode circuit connecting said anode and said cathode, a grid circuit connecting said grid and said cathode, an output transformer for said tube having a winding in said anode circuit, a source of space current for said tube in said anode circuit, means in said anode circuit and in said grid circuits for coupling said anode circuit to said grid circuit including a cathode resistance for producing a first negative feedback component and in series therewith a coil inductively coupled to said winding for producing a second negative feedback component, said resistance and said coil each carrying direct space current of said tube, and a network of resistive and capacitive impedances in said grid circuit for varying in given sense the magnitude of said first feedback component and in inverse sense the magnitude of said second feedback component with given frequency change in a given portion of said frequency range.

12. A voice frequency amplifier comprising: an electric space discharge tube having an anode, a cathode, and a grid; an input circuit for said tube connecting said grid and said cathode and including a filter resistance and a signal source connected between said resistance and said grid; an output transformer for said tube having a primary winding; an output circuit from said cathode to said anode including in the following order an inverse feedback resistance, an inverse feedback winding inductively related to said primary winding, a grid bias resistance, a source of space current for said device, and said primary winding, said output circuit affording a direct-current path from said cathode to said space current source through said feedback resistance, said feedback winding and said bias resistance, and said input circuit including said direct-current path between said cathode and said first resistance; a filter condenser whose capacity is of lower order of magnitude than one microfarad connecting a point of said input circuit between said filter resistance and said signal source to a point between said bias resistance and said feedback winding; and a voltage dividing path connected across said feedback winding and including in series a blocking condenser whose capacity is of lower order of magnitude than one microfarad, a fourth resistance whose impedance is many times the magnitude of the impedance of said feedback winding throughout the useful transmission frequency band of the amplifier, and said filter condenser, with the impedance value of said filter condenser so related to the impedance value of said filter resistance that at frequencies in said band near the low frequency end of the band a substantial amount of series-derived inverse feedback due to said bias resistance takes place but at frequencies in the upper portion of the band series-derived inverse feedback due to said bias resistance is substantially eliminated, and with the value of the impedance of said blocking condenser and said fourth resistance in series so related to the value of the impedance of said filter condenser as to produce at frequencies in the upper portion of said band insignificant reduction in the amount of shunt-derived inverse feedback due to said feedback winding but to produce at frequencies in said band near the low frequency end of said band a substantial decrease in the amount of shunt-derived inverse feedback due to said feedback winding.

STANLEY T. MEYERS.

REFERENCES CITED

The following references are of record in the file of this patent:

UNITED STATES PATENTS

| Number | Name | Date |
|---|---|---|
| 2,267,286 | Meyers | Dec. 23, 1941 |
| 2,315,040 | Bode | Mar. 30, 1943 |